United States Patent [19]

Stieb et al.

[11] Patent Number: 5,722,204
[45] Date of Patent: Mar. 3, 1998

[54] DEVICE FOR HOUSING THE ACTIVE AND PASSIVE JUNCTION ASSEMBLIES OF TELECOMMUNICATIONS INSTALLATIONS

[75] Inventors: Werner Stieb; Franz Grajewski, both of Stadthagen, Germany

[73] Assignee: Alcatel Kabel AG & Co., Germany

[21] Appl. No.: 598,200

[22] Filed: Feb. 7, 1996

[30] Foreign Application Priority Data

Feb. 22, 1995 [DE] Germany ............ 295 02 938 U

[51] Int. Cl.⁶ .................. E02O 29/14; H02G 9/00
[52] U.S. Cl. .................. 52/20; 52/169.6; 174/37; 220/4.02; 220/565; 220/484
[58] Field of Search .............. 52/20, 169.6; 174/37,39, 174/65 R; 220/484, 565, 4.02

[56] References Cited

U.S. PATENT DOCUMENTS

| | | | |
|---|---|---|---|
| 1,044,417 | 11/1912 | Raggio | 220/484 X |
| 2,247,936 | 7/1941 | Bishop. | |
| 2,828,762 | 4/1958 | Swank | 52/20 X |
| 3,377,487 | 4/1968 | McNulty. | |
| 3,482,108 | 12/1969 | Steinmayer. | |
| 3,503,025 | 3/1970 | Weinfurt. | |
| 3,672,103 | 6/1972 | Kost | 52/20 |
| 4,655,361 | 4/1987 | Clover et al. | 220/484 |
| 4,659,251 | 4/1987 | Petter et al. | 52/20 X |
| 5,117,877 | 6/1992 | Sharp | 52/20 X |
| 5,147,980 | 9/1992 | Ferguson | 174/37 |

FOREIGN PATENT DOCUMENTS

| | | |
|---|---|---|
| 873579 | 6/1971 | Canada. |
| 1586162 | 2/1970 | France. |
| 2693320 | 1/1994 | France. |
| 1634624 | 11/1970 | Germany. |
| 2118372 | 10/1972 | Germany. |
| 7812489 | 8/1978 | Germany. |
| 1949694 | 9/1979 | Germany. |
| 3322584 | 11/1983 | Germany. |
| 3714343 | 12/1988 | Germany. |
| 4140701 | 12/1992 | Germany. |
| 9402158 | 5/1994 | Germany. |
| 9410777 | 10/1994 | Germany. |
| 4315275 | 11/1994 | Germany. |
| 9419494 | 3/1995 | Germany. |

OTHER PUBLICATIONS

DIN 4290, Apr. 1963, S. 1–4.

*Primary Examiner*—Robert Canfield
*Attorney, Agent, or Firm*—Ware, Fressola, Van Der Sluys & Adolphson LLP

[57] ABSTRACT

A device for housing the active and passive junction assemblies of underground-located telecommunications installations, with a removable holding fixture for the assemblies placed inside the container, has the following characteristics:

a) the container (6) has a hollow main body portion (6a) and a shoulder portion (6b) which extends conically towards one end, b) a hollow neck portion (6c) is adjacent to the conical portion (6b), c) the container (6) is closed by a cover (7), which simultaneously serves as a sidewalk cover, d) the container (6) rests on a pipe (2) cast into a foundation (1), which protrudes from the foundation (1), while the hollow neck portion (6c) extends into the pipe (2).

28 Claims, 1 Drawing Sheet

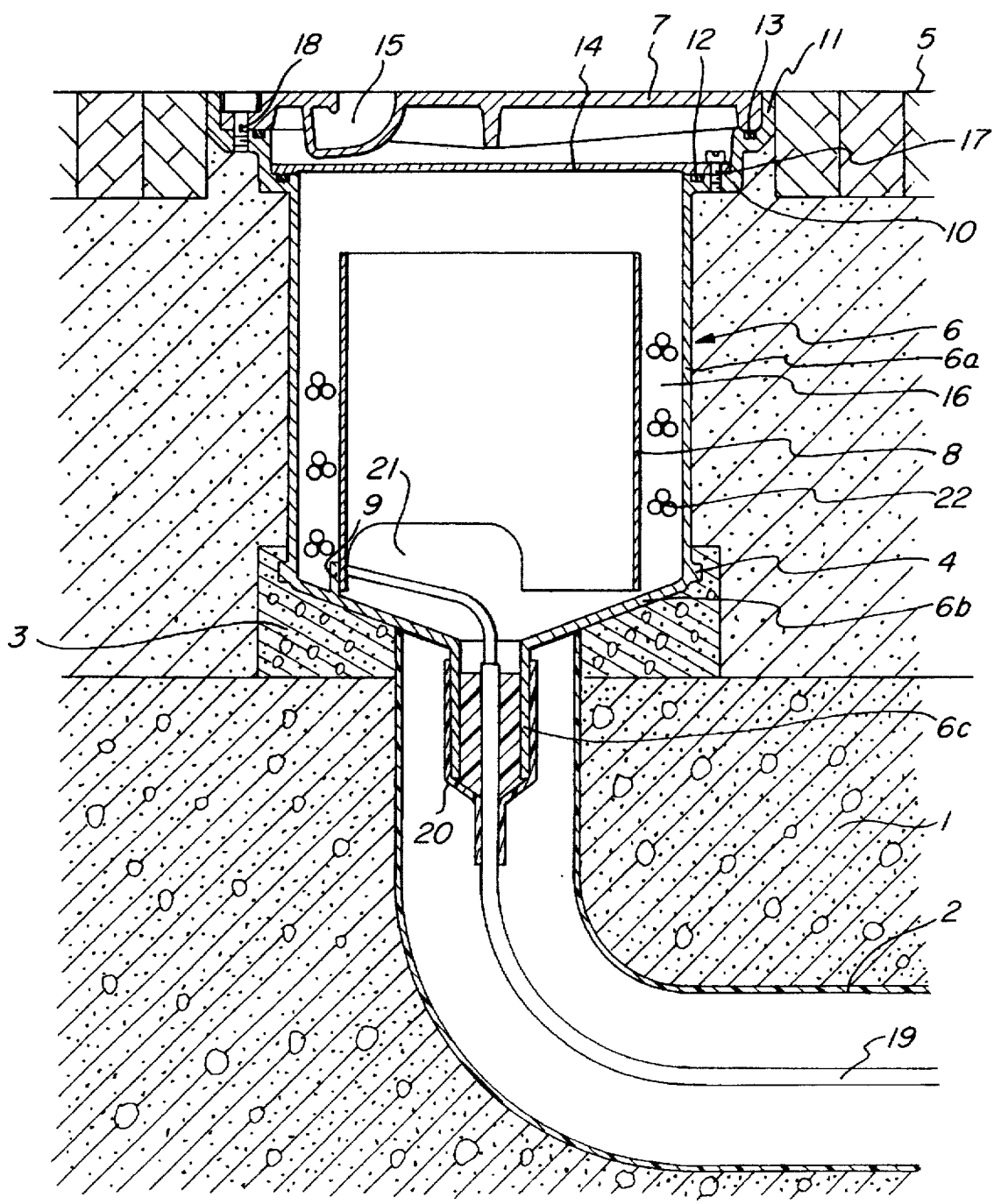

DEVICE FOR HOUSING THE ACTIVE AND PASSIVE JUNCTION ASSEMBLIES OF TELECOMMUNICATIONS INSTALLATIONS

BACKGROUND OF THE INVENTION

1. Technical Field

The invention concerns a device for housing the active and passive junction assemblies of telecommunications installations.

2. Description of the Prior Art

An enclosure with an underground configuration is known from DE-GM 94 02 158; it is used to protect electronics which are sensitive to weather exposure. The enclosure contains a mechanically stable concrete housing with a removable cover, and a pot-shaped container located inside the housing. The housing has a cylindrical insert which is placed inside the pot-shaped container so as to form a gap. The container is closed by a moisture-proof cover. In this underground enclosure, the electronics are located within the container insert.

A disadvantage of the above mentioned dual shell underground system with a concrete outer enclosure and a dual shell plastic inner container is the weight with regard to transportation and installation, as well as the high cost of the system due to the dual shell construction.

An underground container is known from DE 41 40 701 C1, which is buried except for the upper part. The upper part can be closed with a cover. A receiving ring surrounds the upper part of the container, which can be closed with a manhole cover. The receiving ring is made of concrete because it is obviously subjected to traffic loads. No information has been provided about the material of the container.

Both systems have in common that the transportation of the underground container to the installation site is very expensive because of the container's bulk or the number of its parts.

Dissipating the heat produced by the active components also proves to be quite cumbersome. A further disadvantage of both systems is that the adaptation to the sidewalk level is quite expensive.

SUMMARY OF THE INVENTION

The present invention therefore has the task of making available a device for the subterranean installation of telecommunications components, which does not exhibit the cited disadvantages, i.e. which is easy to transport, cost-effective to manufacture and can be simply adapted with respect to height and inclination to the level or the gradient of a sidewalk. In addition, the device provides a pressure-sealed space for the components.

In contrast to the DE-GM 94 02 158 cited earlier, the invention prefers a single shell construction. Additionally, any forces acting on the container are absorbed and the container seal is guaranteed.

A significant advantage of the invention is that the support of the container is a pipe cast into a lean concrete bed. By separating a certain section of the pipe, the container can be positioned so that its sidewalk cover is flush with the sidewalk level. By aligning the container in the vertical position, it can be adapted to any gradient of the sidewalk.

The invention will be fully understood when reference is made to the following detailed description taken in conjunction with the accompanying drawing.

BRIEF DESCRIPTION OF THE DRAWING

The FIGURE is a cross-sectional view of a telecommunications installation utilizing the device for housing telecommunications junction assemblies of the present invention.

DETAILED DESCRIPTION OF THE INVENTION

Referring to the FIGURE, therein is illustrated a container 6 which is hollow and is preferably configured to have a rotational symmetric design. In its preferred configuration, it is made of cast iron, but other production types can be envisioned such as cast aluminum or a glass fiber-reinforced plastic. The container 6 comprises a cylindrical hollow main body portion 6a, a conical shoulder portion 6b and an adjacent cylindrical hollow neck portion 6c. The shoulder portion 6b could also be half-dome shaped.

On the inside of the container 6 is an inner pipe 8, which is secured by three segments 9 (only of which one illustrated). Each segment 9 extends over an angle of 60°. These segments 9 form part of the container 6.

The internal space of the inside pipe 8 serves to receive assembly holders which are not shown for purposes of clarity of illustration. An annular gap 16 is defined between the inside pipe 8 and the cylindrical area 6a of container 6 and is designed to store cables or wires 22.

A circumferential bead 4 is also part of the container 6 and is formed at the juncture of the cylindrical hollow main body portion 6a and the conical portion 6b. The advantage of this bead 4 is explained below hereinafter.

The upper edge of the container 6 comprises a first expansion 10 with a circumferential annular groove 12 and a second expansion 11 which also contains a circumferential annular groove 13. Each annular groove 12 and 13 contains a not further identified seal, e.g. in the form of a seal ring. However, in each case the seal could also be located in a corresponding annular groove in the respective cover.

The expansion 10 supports a cover 14 made of gray-cast iron, which is secured to the expansion 10 with screw bolts 17 (only one illustrated). The cover 14, in conjunction with the seal in the annular groove 12 and the screw bolts 17, ensures that the container 6 is securely pressure-sealed against an internal pressure of 0.05 to 1.5 bar.

A sidewalk cover 7 is supported by the second expansion 11, to which it is secured by screw bolts 18 (only one illustrated), and seals the container 6 against the entrance of moisture by means of a seal located in the annular groove 13. A grip depression 15 is provided in the sidewalk cover 7 to ease the removal of the cover 7. The sidewalk cover 7 should not protrude above the surface of the sidewalk 5.

The installation of the underground container 6 is as follows: first a foundation 1, e.g. of lean concrete, is cast to a predetermined depth. The foundation 1 embodies a pipe 2, preferably made of polyvinyl chloride with a diameter of 100 mm. The pipe 2 protrudes a few centimeters from the foundation 1. The cable 19 to be fed into the container 6, e.g., a bundle composed of a conventional telecommunications cable, a power supply cable and a fiber optic cable, is inserted into the pipe 2 before the foundation 1 is cast. After the concrete has hardened, the container 6 is placed over the open end of the pipe 2. Shortening the pipe 2 allows the sidewalk cover 7 to be precisely adapted to the level of sidewalk 5. If the sidewalk 5 has a gradient, it can be compensated by placing the container 6 at an angle over the pipe 2. A mortar bed 3 is cast around the pipe 2, the portion 6b and a part of the portion 6a. A type of spring-formwork is preferred for this casting. The bead 4 prevents the container 6 from being displaced with respect to its level and inclination.

Before the final installation of the container 6 on the pipe 2, a heat shrinkable sleeve 20 is placed over the portion 6c, or a not illustrated distribution cap in the case where several cables must be inserted into the container 6, the sleeve 20 is then shrunk over the portion 6c and the cable 19 to seal the gap between the cable 19 and portion 6c.

After the shrunk sleeve 20 has set, resin can be poured from above into the portion 6c, which secures the cable 19 in the portion 6c and forms a strain relief for the cable 19 and a downward seal. If the cable 19 is located in the portion 6c, the casting resin simultaneously serves to close off the end of the cable 19.

The introduction of the cable 19 into the container 6, and the sealing by means of the shrunk sleeve 20, or the distribution cap and sealing with the casting resin has preferably already taken place in the factory, so that a prefabricated container 6 can be delivered, whose cable 19 must be connected to the existing cables at the site.

The exposed cable core 22 stored inside the annular gap 16 has several turns, so that the assembly holder can be removed from the container 6 for measuring during troubleshooting.

An opening 21 enables the introduction of the cable core wires 22 to the inside of the inner pipe 8. Finally, the two covers 14 and 7 are installed and the trench or excavation is filled with sand.

It is a special advantage if the container 6 is made of gray-cast iron. This provides for less weight as opposed to the dual shell construction, thereby simplifying the transportation and the installation. The container 6 is in a position to accept the loads exerted on it by the earth as well as the traffic loads. However, it is a special advantage that the waste heat given off by the telecommunications assemblies can be quickly dissipated into the adjacent earth due to the reduced wall thickness and the good thermal conductivity of gray-cast iron.

The preferred embodiment described above admirably achieves the objects of the invention. However, it will be appreciated that departures can be made by those skilled in the art without departing from the spirit and scope of the invention is limited only by the following claims.

What is claimed is:

1. A telecommunications installation installed underground, the ground having a gradient, the installation having:
   (a) a concrete foundation;
   (b) a pipe cast into the foundation so that at least a portion of the pipe protrudes from the foundation; and
   (c) a device for storing active and passive junction assemblies comprising:
      (i) a container having a hollow main body portion with a shoulder portion which narrows down to a hollow neck portion, the shoulder portion of the container adapted to rest on the protruding portion of the pipe to be cast into the foundation whereby the container is placeable at various angles thereby compensating for variations in the gradient of the ground, the hollow neck portion adapted to extend into the pipe and providing an open end to receive at least one cable therethrough; and
      (ii) a sidewalk cover resting on the container to close the container.

2. A telecommunication installation as claimed in claim 1, wherein the hollow main body portion and the hollow neck portion are hollow cylinders.

3. A telecommunication installation as claimed in claim 1, further comprising a circumferential bead in a transition area from the hollow main body portion to the hollow neck portion.

4. A telecommunication installation as claimed in claim 1, further comprising at least one cable for supplying the assemblies, the at least one cable extending into the container through the open end of hollow neck portion.

5. A telecommunication installation as claimed in claim 4, further comprising a heat-shrunk sleeve placed over the at least one cable and the hollow neck portion to seal the open end thereof.

6. A telecommunication installation as claimed in claim 5, wherein the hollow neck portion with the at least one cable therein and the open end thereof sealed by the heat-shrunk sleeve is filled with casting resin.

7. A telecommunication installation as claimed in claim 1, further comprising a pipe held concentrically inside the container.

8. A telecommunication installation as claimed in claim 7, wherein the concentrically held pipe is attached to three segments, which are located on the shoulder portion.

9. A telecommunication installation as claimed in claim 7, wherein the concentrically held pipe and the hollow main body portion define an annular gap adapted to receive stored cable or wire.

10. A telecommunication installation as claimed in claim 1, further comprising a first flange-type expansion located on an upper edge of the container and adjoined by a second flange-type expansion, both flange-type expansions have a circumferential groove with a ring seal therein, a cover is attached to the first flange-type expansion to provide a pressure seals on the container, and that the sidewalk cover seats on the second flange-type expansion.

11. A telecommunication installation as claimed in claim 10, wherein the sidewalk cover is secured to the second flange-type expansion by at least two screw bolts.

12. A telecommunication installation as claimed in claim 10, wherein the sidewalk cover contains a grip depression which faces outwardly.

13. A telecommunication installation as claimed in claim 10, wherein the cover attached to the first flange-type expansion is made of gray-cast iron.

14. A telecommunication installation as claimed in claim 1, wherein the container is made of a material chosen from a group consisting of metal and glass fiber-reinforced plastic.

15. A telecommunication installation as claimed in claim 14, wherein the metal is gray cast iron.

16. An underground telecommunications installation for storing active and passive junction assemblies, the installation comprising:
   (a) a concrete foundation;
   (b) a pipe cast into the foundation so that at least a portion thereof protrudes from the foundation;
   (c) a container resting on the protruding portion of the pipe, the container having a hollow main body portion with a shoulder portion which narrows down to a hollow neck portion., the hollow neck portion extends into the pipe and provides an open end to receive at least one cable therethrough; and
   (d) a sidewalk cover resting on the container to close the container.

17. An underground telecommunications installation as claimed in claim 16, further comprising a mortar bed surrounding the protruding portion of the pipe as well as at least a part of the hollow main body portion.

18. An underground telecommunications installation as claimed in claim 16, further comprising at least one cable for supplying the assemblies, the at least one cable extending through the pipe and into the container through the open end of hollow neck portion.

19. An underground telecommunications installation as claimed in claim 18, further comprising a heat-shrunk sleeve placed over the at least one cable and the hollow neck portion to seal the open end thereof.

20. An underground telecommunications installation as claimed in claim 19, wherein the hollow neck portion with the at least one cable therein and the open end thereof sealed by the heat-shrunk sleeve is filled with casting resin.

21. A device for storing active and passive junction assemblies in an underground telecommunications installation, the installation having a concrete foundation and a pipe cast into the foundation so that at least a portion of the pipe protrudes from the foundation, the device comprising:
  (a) a container adapted to rest on the protruding portion of the pipe, the container having a hollow main body portion with a shoulder portion which narrows down to a hollow neck portion, the hollow neck portion adapted to extend into the pipe and providing an open end to receive at least one cable therethrough; and
  (b) a sidewalk cover resting on the container to close the container; and
  (c) a heat-shrunk sleeve placed over the at least one cable and the hollow neck portion to seal the open end thereof.

22. A device as claimed in claim 21, wherein the hollow neck portion with the at least one cable therein and the open end thereof sealed by the heat-shrunk sleeve is filled with casting resin.

23. A device for storing active and passive junction assemblies in an underground telecommunications installation, the installation having a concrete foundation and a pipe cast into the foundation so that at least a portion of the pipe protrudes from the foundation, the device comprising:
  (a) a container adapted to rest on the protruding portion of the pipe, the container having a hollow main body portion with a shoulder portion which narrows down to a hollow neck portion, the hollow neck portion adapted to extend into the pipe and providing an open end to receive at least one cable therethrough; and
  (b) a sidewalk cover resting on the container to close the container; and
  (c) a pipe held concentrically inside the container and wherein the concentrically held pipe is attached to three segments, which are located on the shoulder portion.

24. A device as claimed in claim 23, wherein the concentrically held pipe and the hollow main body portion define an annular gap adapted to receive stored cable or wire.

25. A device for storing active and passive junction assemblies in an underground telecommunications installation, the installation having a concrete foundation and a pipe cast into the foundation so that at least a portion of the pipe protrudes from the foundation, the device comprising:
  (a) a container adapted to rest on the protruding portion of the pipe, the container having a hollow main body portion with a shoulder portion which narrows down to a hollow neck portion, the hollow neck portion adapted to extend into the pipe and providing an open end to receive at least one cable therethrough; and
  (b) a sidewalk cover resting on the container to close the container; and
  (c) a first flange-type expansion located on an upper edge of the container and adjoined by a second flange-type expansion, both flange-type expansions have a circumferential groove with a ring seal therein, a cover is attached to the first flange-type expansion to provide a pressure seals on the container, and that the sidewalk cover seats on the second flange-type expansion.

26. A device as claimed in claim 25, wherein the sidewalk cover is secured to the second flange-type expansion by at least two screw bolts.

27. A device as claimed in claim 25, wherein the sidewalk cover contains a grip depression which faces outwardly.

28. A device as claimed in claim 25, wherein the cover attached to the first flange-type expansion is made of gray-cast iron.

* * * * *

UNITED STATES PATENT AND TRADEMARK OFFICE
CERTIFICATE OF CORRECTION

PATENT NO. : 5,722,204
DATED : March 3, 1998
INVENTOR(S) : Werner Stieb, et. al.

It is certified that error appears in the above-identified patent and that said Letters Patent is hereby corrected as shown below:

On cover page, under "Foreign Patent Documents", "9419494" should be --9419491--.

Column 4, in line 61, delete "."

Signed and Sealed this

Second Day of June, 1998

Attest:

BRUCE LEHMAN

Attesting Officer        Commissioner of Patents and Trademarks